United States Patent [19]
Miki et al.

[11] Patent Number: 5,165,791
[45] Date of Patent: Nov. 24, 1992

[54] METHOD AND APPARATUS FOR MEASURING TEMPERATURE BASED ON INFRARED LIGHT

[75] Inventors: Atsushi Miki; Masanori Nishiguchi, both of Yokohama, Japan

[73] Assignee: Sumitomo Electric Industries, Ltd., Japan

[21] Appl. No.: 759,552

[22] Filed: Sep. 13, 1991

[30] Foreign Application Priority Data

| Sep. 18, 1990 [JP] | Japan | 2-247946 |
| Dec. 12, 1990 [JP] | Japan | 2-401629 |
| Jan. 9, 1991 [JP] | Japan | 3-970 |
| Jan. 9, 1991 [JP] | Japan | 3-974 |

[51] Int. Cl.⁵ .................. G01J 5/08; G01K 3/10
[52] U.S. Cl. ................................. 374/9; 364/557; 364/581; 374/126
[58] Field of Search ............ 374/126, 9; 364/557, 364/581

[56] References Cited

U.S. PATENT DOCUMENTS

| 4,797,840 | 1/1989 | Fraden | 364/557 |
| 4,881,823 | 11/1989 | Tanaka et al. | 374/126 |
| 4,919,542 | 4/1990 | Nulman et al. | 374/9 |
| 4,926,364 | 5/1990 | Brotherton | 364/557 X |
| 4,979,134 | 12/1990 | Arima et al. | 364/557 |

Primary Examiner—Daniel M. Yasich
Attorney, Agent, or Firm—Beveridge, DeGrandi & Weilacher

[57] ABSTRACT

A method of using infrared light for measuring the temperature of a semiconductor element with a surface layer formed by two kinds of materials that have different emissivities and optical reflectances is disclosed. The method includes the step of taking an image with diffused light reflected from the surface of a semiconductor element by an image taking device. The method further includes determining the area ratio with which each of the two kinds of materials occupy the surface of the semiconductor element by comparing the average brightness value of the image by the image taking device with the brightness value of an image wherein each of the materials independently forms the surface layer of the above semiconductor element, obtaining a weighted average of the emissivities of the materials with the area ratio at which each of the materials occupies on the surface of the semiconductor element, and calculating the temperature of the semiconductor element based on the weighted average and the actual amount of infrared emission.

13 Claims, 9 Drawing Sheets

Enlarged figure.

METHOD AND APPARATUS FOR MEASURING TEMPERATURE BASED ON INFRARED LIGHT

BACKGROUND OF THE INVENTION

1. Field of the Invention

The present invention relates to a method and an apparatus for measuring the temperature of a semiconductor element, the surface of which is formed with not less than two materials having different emissivities, based on the amount of infrared emission.

2. Related Background Art

As disclosed by G. A. Benett et al. in "IEEE TRANSACTIONS ON COMPONENTS, HYBRIDS AND MANUFACTURING TECHNOLOGY (pp. 690-695, VOL.12, NO.4, DECEMBER, 1989)," in the conventional method for measuring temperature based on infrared light, the emissivity of one kind of material having a sufficient area formed on a semiconductor element is measured, and its temperature is determined from the amount of infrared emission emitted therefrom. However, many kinds of materials such as insulating films and metals are formed into patterns on the surface of a semiconductor element, and these patterns are in many cases micro-patterns. When the average temperature of a region having a sufficient area on the surface is to be determined, even if there is a fine temperature distribution, detection accuracy does not decrease to a large extent because the measured data can be averaged. But, when it is desired to fractionate each pattern and measure the temperature thereof, it is necessary to take a picture of the surface of the semiconductor element using an infrared camera having high special resolution and to process the data.

However, according to the above measuring method, the spacial resolution cannot be improved without restrictions, because an optical lens has to be used for forming the image and infrared light having a long wavelength is used. The spacial resolution is in the order of 15 μm according to the present technology, which is insufficient for measuring the temperature of a highly integrated semiconductor element.

SUMMARY OF THE INVENTION

Accordingly, an object of the invention is to provide a method for measuring the temperature of a semiconductor element based on infrared light, which permits the easy and rapid determination of the distribution of temperature, which is finer than the spacial resolution determined by the wavelength of infrared light and the image-forming system to be used.

To achieve the above object, in a method for measuring temperature based on infrared light which measures the temperature of a semiconductor element, the surface layer of which is formed with not less than two materials having different emissivity, based on the amount of infrared emission, the present invention is characterized in that for the emissivities of the above not less than two materials, a weighted average is obtained using the area ratio at which each of the above not less than two materials occupies the surface of the semiconductor element, and the temperature of the semiconductor element is calculated based on the weighted average and the actual amount of the emission.

When the amount of infrared emission actually measured from the semiconductor element placed in an atmosphere at a temperature is represented by $N_m$, its emissivity is represented by $\epsilon$, the amount of infrared emission from a standard material (for example, a black body) at the temperature is represented by $N_T$, and the amount of infrared emission of the atmosphere is represented by $N_a$, the well-known relation $$N_m = \epsilon N_T + (1-\epsilon) N_a \tag{1}$$

holds (IEEE TRANSACTIONS ON COMPONENTS, HYBRIDS AND MANUFACTURING TECHNOLOGY, p.691, Vol.12, NO.4, DECEMBER 1989). Herein, both $N_m$ and $N_a$ can be determined easily by a well-known method. $N_m$ can be determined using an infrared detector, and $N_a$ can be calculated based on the amounts of infrared emission from the semiconductor element and the standard material at known temperatures. Then, in a semiconductor element comprising a plurality of materials, by calculating the weighted average of the emissivities of the materials by their area ratios, the infrared emissivity $\epsilon$ for the semiconductor element is determined. By putting $N_m$, $N_a$ and $\epsilon$ into equation (1), $N_T$ is determined. Because the infrared emissivity corresponds uniquely to the temperature of the standard material, the temperature is determined uniquely from the amount of the infrared emission $N_T$.

If the surface of the semiconductor element is formed with two materials having different optical reflectances, the area ratio at which each of the above two kinds of materials occupies the surface of the above semiconductor element can be determined by obtaining image data by detecting the reflected light of a beam of light incident on the surface of a semiconductor element and binarizing the image data with a constant brightness being a boundary value.

Further, the area ratio at which each of the above two kinds of materials occupies the surface of the semiconductor element can be determined by comparing the average brightness value of the above image with the brightness value of an image for the case that each of the above two kinds of materials independently forms the surface layer of the semiconductor element.

To achieve the above object, in a method for measuring temperature based on infrared light which measures the distribution of surface temperature on a semiconductor element based on the amount of infrared emission, the method for measuring temperature based on infrared light according to the present invention is characterized by having the first step of obtaining detection pattern data corresponding to the distribution of surface temperature based on data wherein infrared light from the surface of the semiconductor element is incorporated, the second step of obtaining shift pattern wherein the detection pattern data are shifted in a predetermined direction along the surface of the semiconductor element, the third step of obtaining difference pattern data by taking the difference in temperature between the detection pattern data and the shift pattern data, and the fourth step of obtaining the distribution of surface temperature on the semiconductor element based on the positions of inversion at which the difference pattern data invert between positive and negative. Herein, the fourth step may be a step to determine the distribution of surface temperature on the semiconductor element based on the quantity shifted in the second step and the positions of inversion at which the difference pattern data invert between positive and negative.

According to the above invention, difference pattern data are obtained from shift pattern data wherein detected pattern data are shifted and taking the difference between them. Herein, the difference pattern data are equivalent to data wherein the detection pattern data are differentiated, so that the sign of the difference data inverts between positive and negative at the positions of peaks and troughs in the temperature distribution. Therefore, the temperature distribution can be determined from the inverting positions of the sign of the difference data. Furthermore, by taking the above shift quantity into account, a positional discrepancy in the pattern data due to the shift can be corrected.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

The above situation stated in the "Related Background Art" is explained more concretely with reference to FIGS. 1A to 1D. In general, it is assumed that the value indicated as spacial resolution is in the state shown in FIGS. 1A and 1B. That is, when there are high-temperature parts $A_1$ and $B_1$, which are close to each other, and when there is a peak of detection due to the high-temperature part $B_1$ at an outermost position $X_1$ in the region wherein a detected value is influenced by the high-temperature part $A_1$ (the region covered by a dotted line in FIG. 1B), the interval between these peaks is indicated as so-called spacial resolution. Therefore, in the state shown in FIGS. 1C and 1D, high-temperature parts $A_2$ and $B_2$ are closer to each other than the spacial resolution. Of course, even in the case of FIGS. 1C and 1D, it is possible to fractionate the high-temperature peaks by processing the detected data (indicated in FIG. 1D) according to a predetermined procedure. However, as data processing is not easy, a long time is required for data processing when it is desired to determine the distribution of temperature on the whole surface of a semiconductor element or to find a high-temperature micro-spot.

The method for measuring temperature based on infrared light according to one embodiment of the invention is described in the following with reference to the appended FIGS. 2 to 5.

Firstly, the mirco-pattern formed on the surface of the semiconductor element is explained with reference to FIG. 2. This micro-pattern comprises two kinds of materials a and b, and the area ratio of the material a to the material b on the surface of the sekmiconductor element is 3 to 1. In most cases, this area ratio is usually detemined at the design stage for the seiniconductor elements, but it can be measured afterwards by taking a microscope picture. These materials a and b are formed into patterns at an order of several microns.

Figure 3:
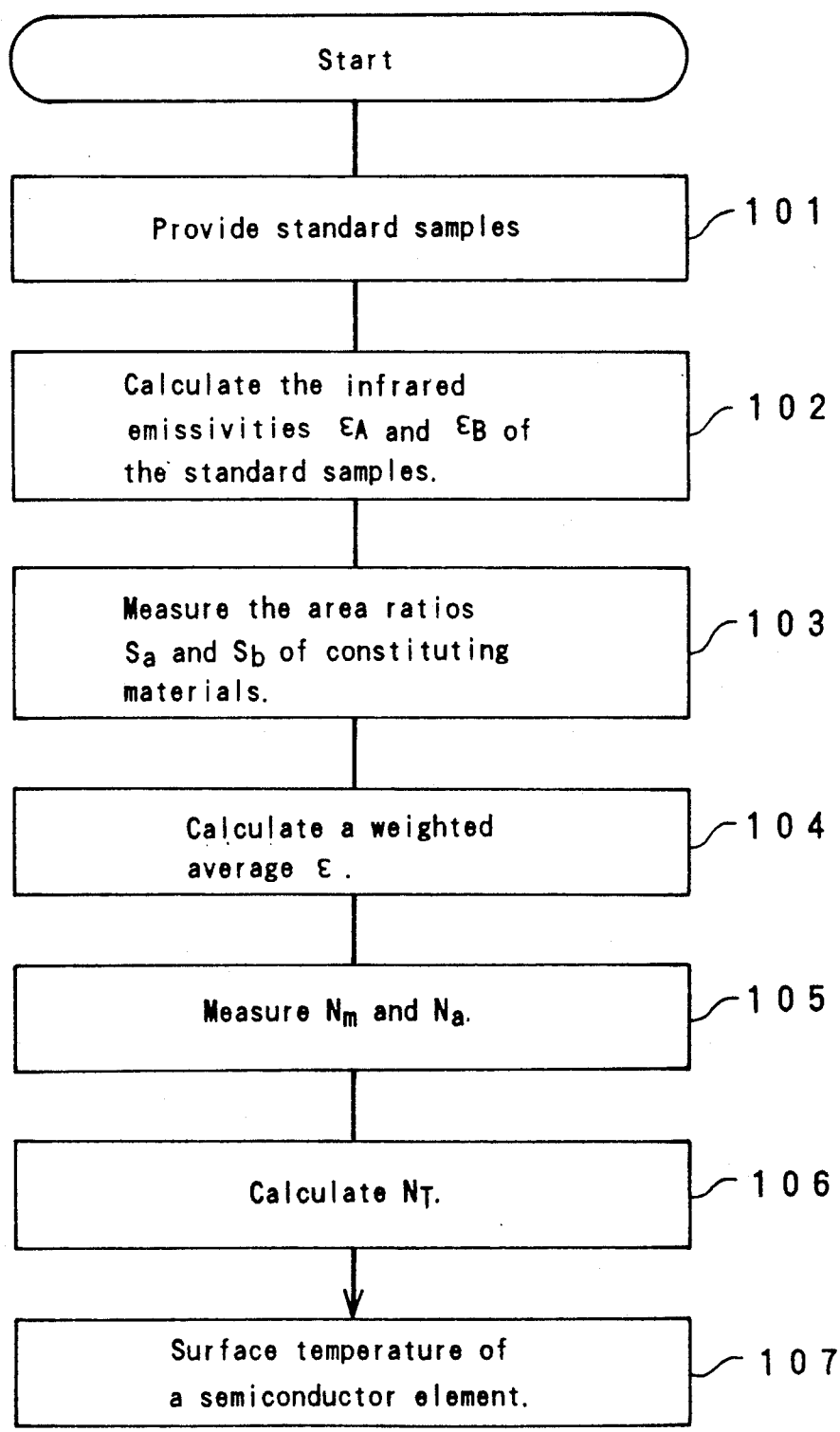
FIG. 3 is a step diagram showing the method for measuring temperature based on infrared light according to one embodiment of the present invention.

Next, a method for obtaining the area ratio of the constituting materials forming the surface layer of the semiconductor element, which can be applied to this embodiment, will be explained with reference to FIG. 3.

Figure 4:
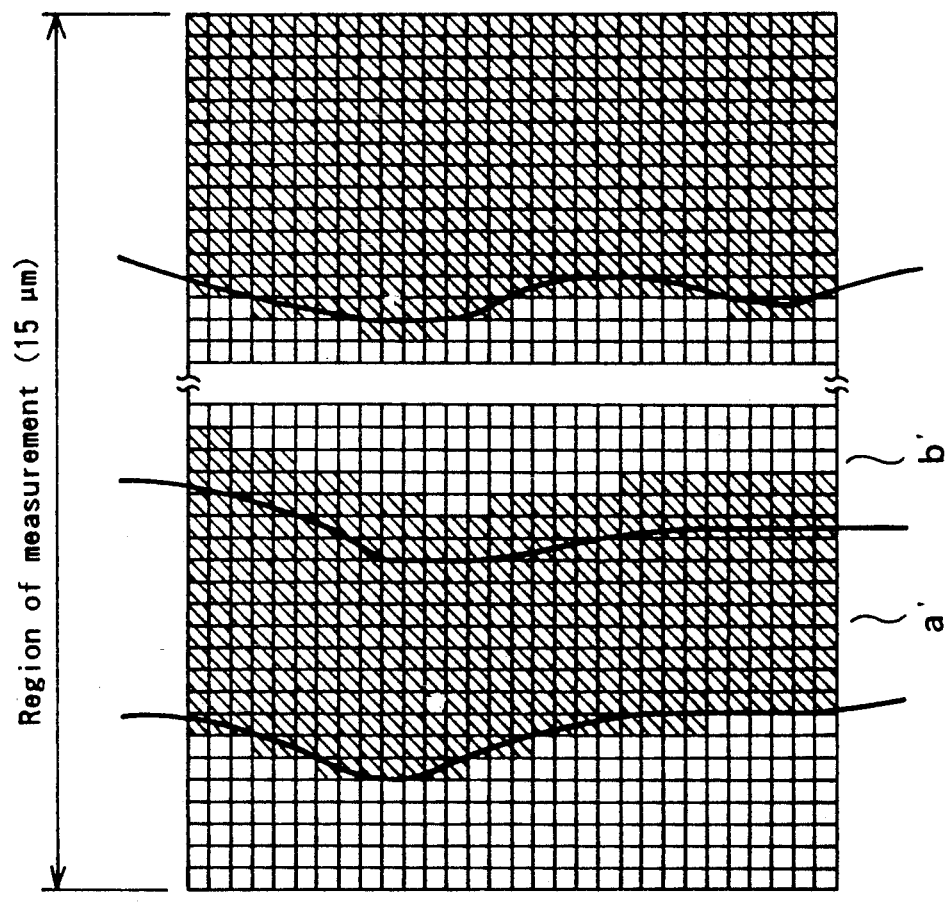
FIG. 4 is a view showing binarized data indicating regions of a high brightness and those of a low brightness, schematically showing the state that the binarized data are expressed as image elements.

If the standard of samples A and B, $R_A$ and $R_B$, satisfy $R_A < R_B$, wherein the samples A and B are standard samples for the materials a and b (FIG. 2A), when light is incident on a part of the surface of the semiconductor element, the surface comprising the mateials a and b, material b looks brighter than material a. Accordingly, when this is observed using a microscope to which a CCD camera or the like is attached, it can be judged that the region having a high brightness comprises the material b and the region having a low brightness comprises the material a. Accordingly, an intermediate brightness value (or a voltage output value corresponding to the intermediate brightness value) between the brightness value indicating the material a and the brightness value indicating the material b is set as a standard value, and based on the standard value, the image data are binarized (see FIG. 4). In FIG. 4, a low brightness region a' indicating the material a and a high brightness region b' indicating the material b are shown. Thereafter, by counting the number of image elements belonging to each region, the area ratio of the material a to the material b in the region measured can be determined accurately from the sum of the image elements in each region. This can be carried out easily by image processing using a computer.

Figure 1A:
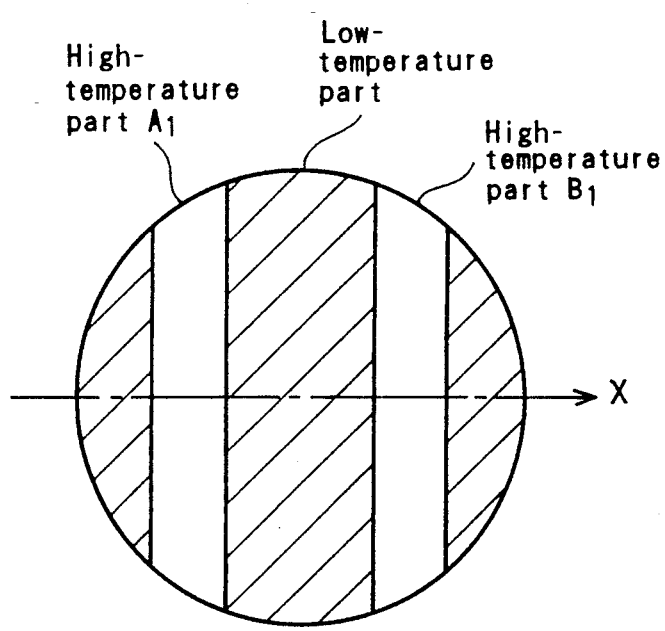
FIGS. 1A to 1D are views explaining spacial resolution.
Figure 1B:
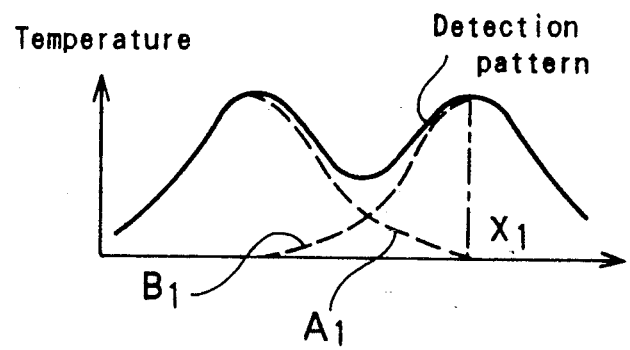
Figure 1C:
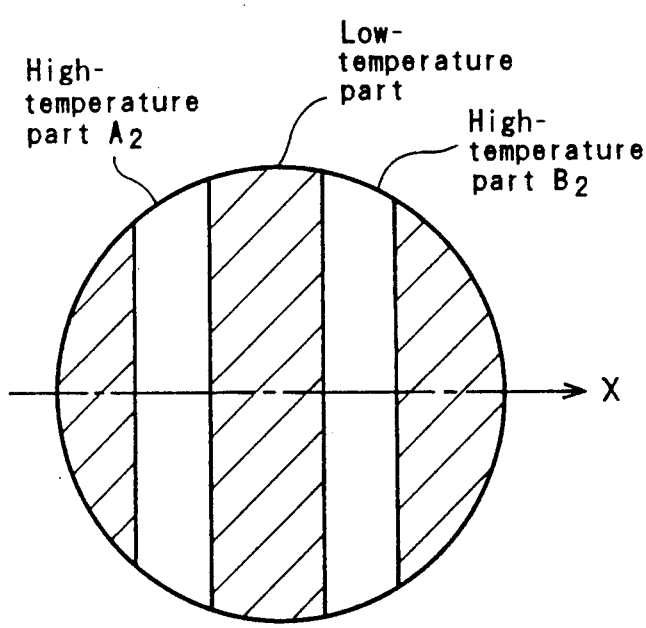
Figure 1D:
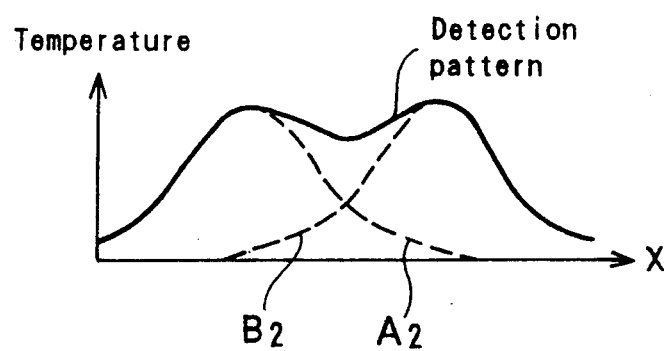
Figure 2A:
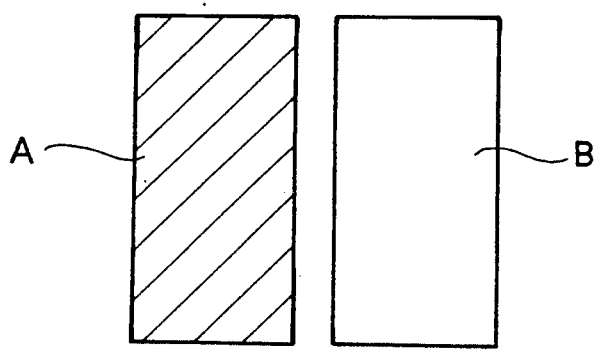
FIGS. 2A and 2B are views showing an example of the patterns of a semiconductor element which permits measurement by the method for measuring temperature according to the invention.
Figure 2B:
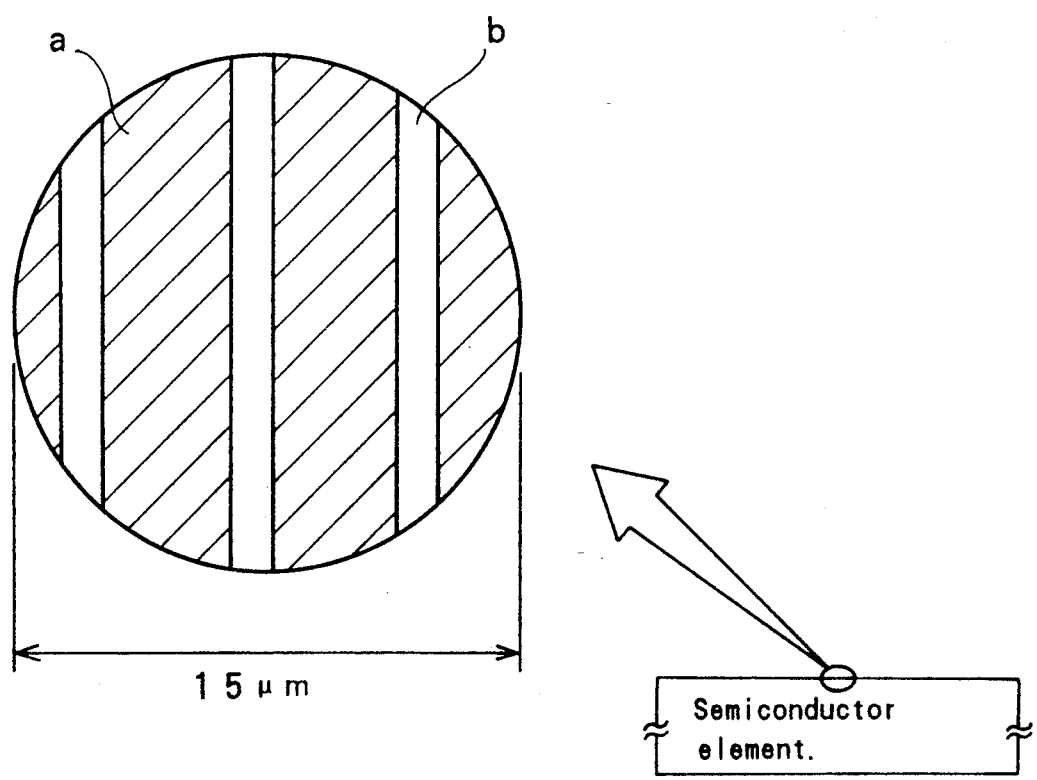
Figure 5A:
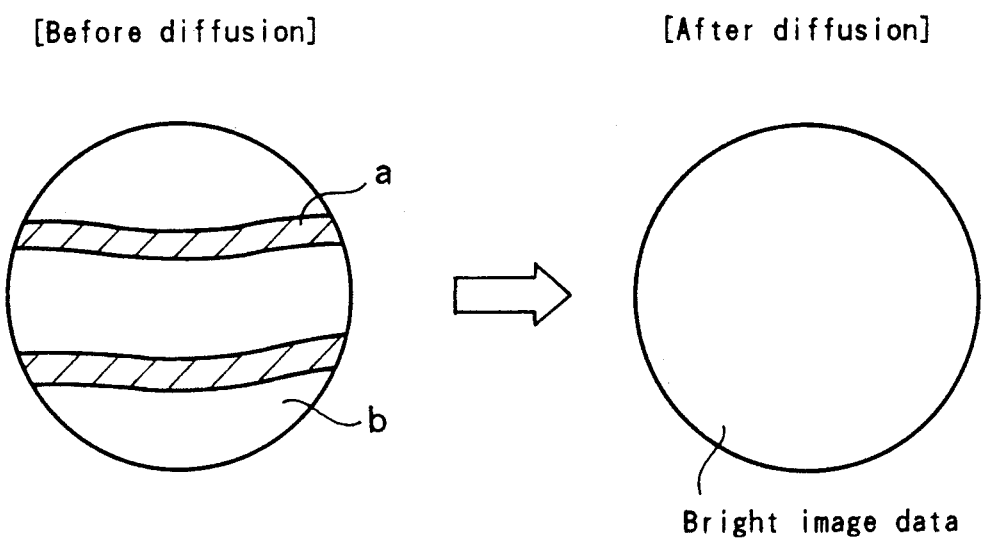
FIG. 5A and FIG. 5B are views which schematically show an image before and after diffusing reflected light in a semiconductor element having different area ratios.
Figure 5B:
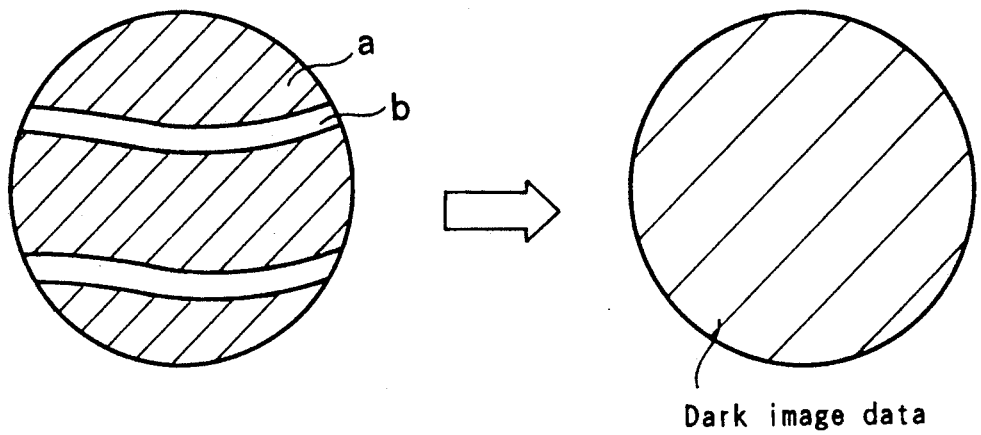

This area ratio can be obtained by using the method as follows. If the reflectances of samples A and B, $R_A$ and $R_B$, satisfy $R_A < R_B$, wherein the samples A and B are standard samples of the materials a and b (see FIG. 2A), when light is incident on a part of the surface of the semiconductor element, the surface comprising the materials a and b, the material b looks brighter than the material a as shown in FIG. 2B. Next, the lens of the lighting optical system used for irradiating the semiconductor element with a beam of light from a light source is set out of focus, or a diffusing plate is inserted into the light path through which reflected light from the semiconductor element is taken in to an image taking device such as a CCD. Then, as shown in FIGS. 5A and 5B, when the material b having a high reflectance is dominating by the area ratio, the image of the image taking device becomes bright as a whole (FIG. 5A). On the other hand, when a material a having low reflectance is dominating by the area ratio, the image of the image taking device becomes dark as a whole (FIG. 5B). Herein, when the brightness value of an image for the case that only the material a is present on the semiconductor element is represented by $I_a$, the brightness value of the image for the case that only the material b is present on the semiconductor element is represented by $I_b$, the area ratios of the materials a and b are represented by $S_a$ and $S_b$, respectively, and the brightness value of image obtained by diffusing the reflected light from the surface of the semiconductor element is represented by I, the following equation holds:

$$I = (S_a \cdot I_a + S_b \cdot I_b)/(S_a + S_b).$$

Therefore, by determining I, $I_a$ and $I_b$, $S_a$ and $S_b$ can be calculated. These calculations can be carried out easily by image processing and calculation processing using a computer.

Next, the method for measuring temperature according to the invention is explained with reference to FIG. 3. Firstly, standard samples A and B, which are standard samples for the materials a and b constituting the semiconductor element, are provided (step 101). The sizes of the standard samples A and B, formed to a sufficient size using the materials a and b, do not necessarily need to be the area ratio of the constituting materials a and b on the semiconductor element (see FIG. 2A). Because these standard samples A and B have a sufficient area, their material-specific emissivities can be determined from the standard samples A and B.

Concretely, the amounts of infrared emission from the standard samples A and B, $N_{Am1}$ and $N_{Bm1}$, measured in an atmosphere at a known temperature $T_1$, the amount of infrared emission of a black body at the temperature, $N_{T1}$, the amounts of infrared emission from the standard samples A and B, $N_{Am2}$ and $N_{Bm2}$, measured in an atmosphere at a known temperature $T_2$, and the amount of infrared emission of the black body at the temperature, $N_{T2}$, are obtained. Then, based on these values, the emissivities $\epsilon_A$ and $\epsilon_B$ are obtained from the following equations derived by transforming equation (1) (step 102):

$$\epsilon_A = (N_{Am1} - N_{Am2})/(N_{T1} - N_{T2})$$

$$\epsilon_B = (N_{Bm1} - N_{Bm2})/(N_{T1} - N_{T2}).$$

Then, the area ratios of the constituting materials a and b on the surface of the semiconductor element, $S_a$ and $S_b$, are respectively measured (step 103). These measurements are not necessary when the area ratios $S_a$ and $S_b$ are already known in the design stage.

Thereafter, for the infrared emissivities of the standard samples A and B, $\epsilon_A$ and $\epsilon_B$, the weighted average $\epsilon$ of the infrared emissivities by the area ratios $S_a$ and $S_b$ is obtained according to the following equation (step 103):

$$\epsilon = \epsilon_A \cdot S_a + \epsilon_B \cdot S_B.$$

For example, if the emissivities $\epsilon_A$ and $\epsilon_B$ are 0.1 and 0.5, respectively, and the area ratios $S_a$ and $S_b$ are 0.75 and 0.25, respectively, the weighted average $\epsilon$ is 0.2.

Next, using an infrared detector, the amount of the actual infrared emission from the semiconductor element, $N_m$, and the amount of infrared emission of the atmosphere, $N_a$, are obtained (step 105). $N_a$ is calculated by obtaining the amount of infrared emission $N_{m3}$ at a third known standard temperature $T_3$, and by putting the amount of infrared emission of the black body $N_{T3}$ at the standard temperature $T_3$ and $N_{m3}$ into the following equation derived by transforming equation (1):

$$N_a = (N_{m3} - \epsilon N_{T3})/(1 - \epsilon).$$

Next, $N_T$ is obtained using equation (1) (step 106), and based on the $N_T$, the surface temperature of the semiconductor element can be determined (step 107).

As described above, by accurately determining the infrared emissivity in a micro-region comprising a plurality of materials, the surface temperature of a semiconductor element can be measured easily.

Figure 6:
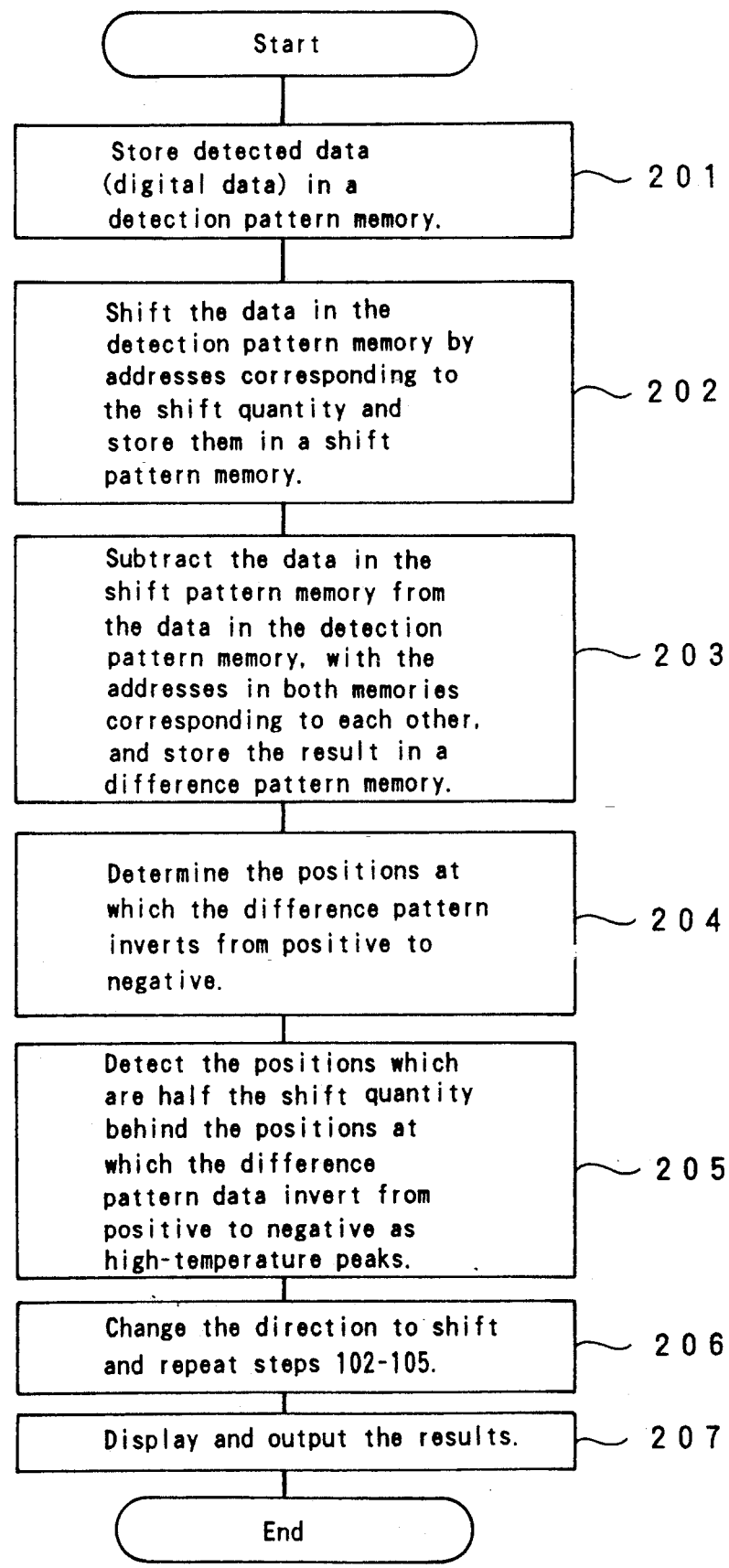
FIG. 6 is a flowchart of the method for measuring temperature based on infrared light according to another embodiment of the invention.

Next, a method for measuring temperature and an apparatus for measuring temperature according to another embodiment of the invention will be explained based on FIGS. 6 to 8.

First, the apparatus for measuring temperature will be explained based on FIG. 8.

This apparatus comprises a camera 1, an A/D converter 3, a CPU 5, a distribution pattern output means 6, a detection pattern memory 41, a shift pattern memory 42, and a difference pattern memory 43.

A semiconductor element 1 is photographed using the camera 2 that is sensitive to infrared light, and the image data therefrom are digitized in the A/D converter 3. The digital image data are stored in the detection pattern memory 41 (step 201). Herein, the detection pattern memory 41 comprises a frame memory, for example, and in an address corresponding to a position on the surface of the semiconductor element 1, the amount of infrared emission at the position is stored as a datum (detection pattern datum). The shift pattern memory 42 and the difference pattern memory 43 respectively comprise the frame memory in the same manner. Therefore, an address in either frame memory corresponds to a position on the semiconductor element, so that the shift datum and difference datum at the position are stored respectively in the corresponding addresses. The detection pattern data are read in the CPU 5, and subjected to shift processing by the pattern shift means 51. Herein, the pattern shift means 51, the difference pattern calculating means 52 and the temperature distribution detection means 53 are realized as software in the CPU 5.

Figure 7A:
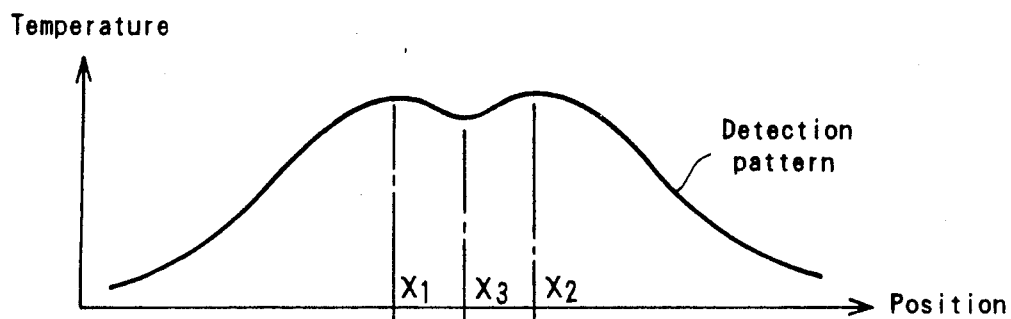
FIGS. 7A to 7C are views which schematically show the main part of the method of the embodiment.
Figure 7B:
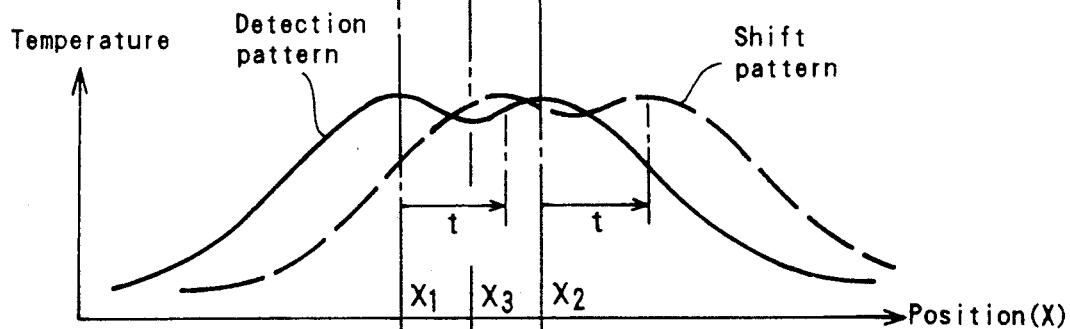
Figure 7C:
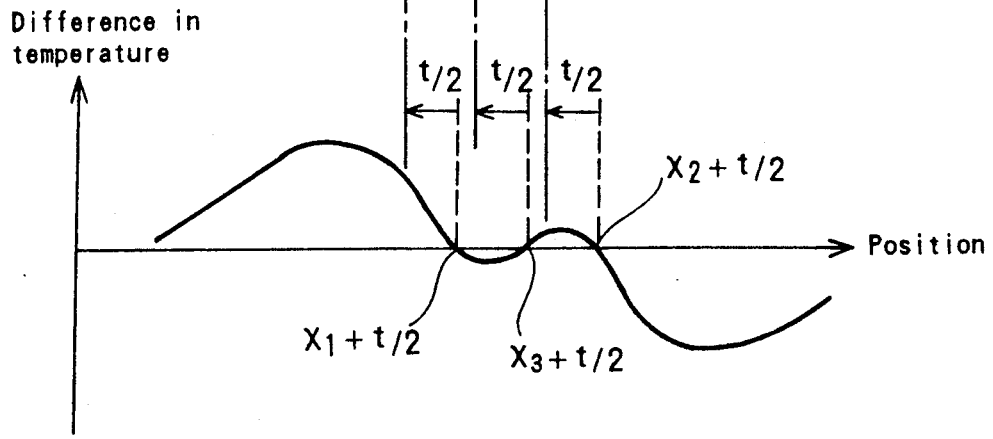
Figure 8:
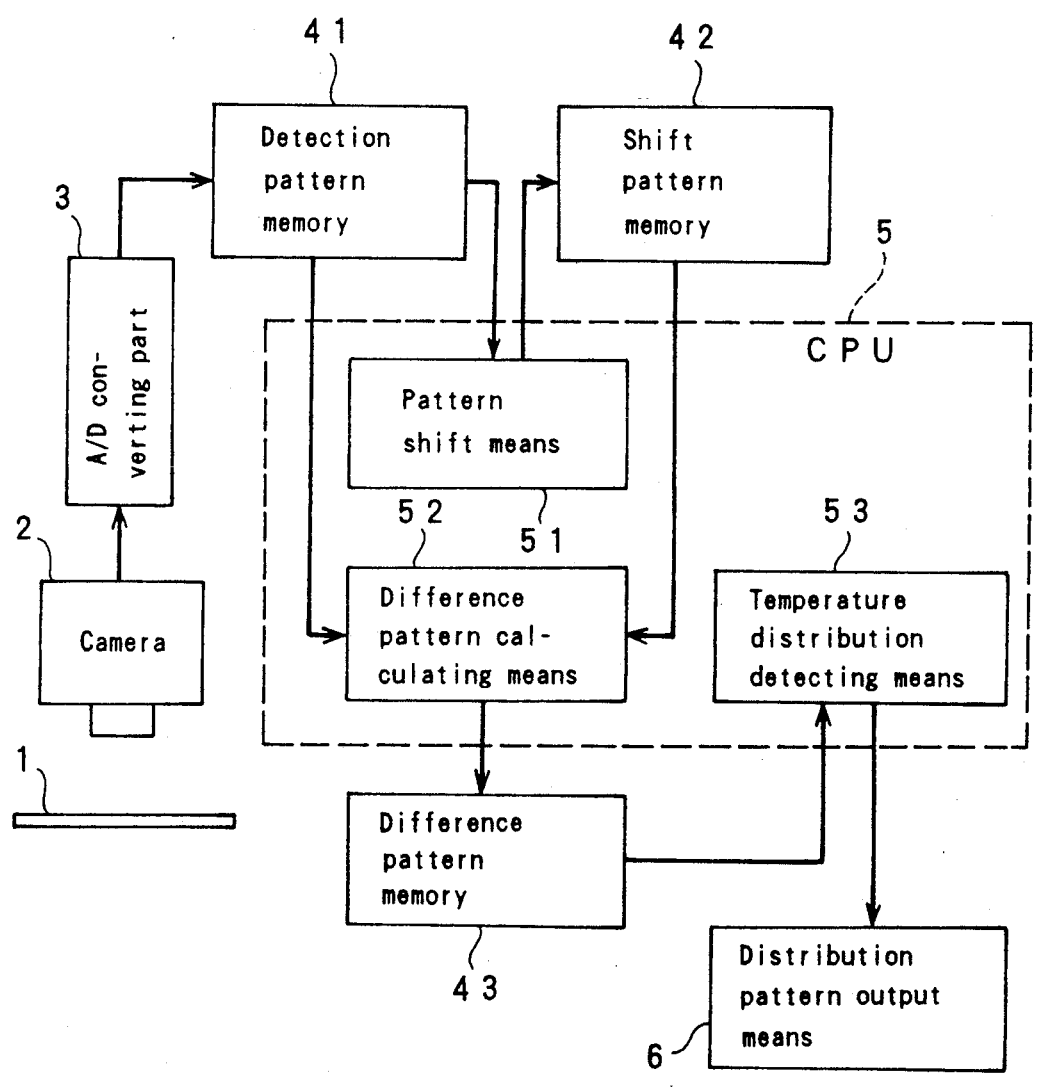
FIG. 8 is a block diagram of a device to which the embodiment is applied.

In the pattern shift means 51 in FIG. 8, detection pattern data are shifted in a predetermined direction for detection. This is explained with reference to FIGS. 7A to 7C. Firstly, detection pattern data stored in the detection pattern memory 41 are assumed to be such data as those in FIG. 7A when expressed schematically in an analog manner. That is, it is assumed that as FIG. 7A, there are a first high-temperature peak at the position $X_1$ on the surface of the semiconductor element, a second high-temperature peak at the position $X_2$ and a low-temperature trough at the position $X_3$, and that the distance between the first and second high-temperature peaks $(X_2 - X_1)$ is smaller (for example, 10 μm) than spacial resolution (for example, 15 μm). In this case, in the pattern shift means 51, for example, the detection pattern data are shifted in the x direction along the surface of the semiconductor element by quantity t, which is half the spacial resolution (=7.5 μm). In the memory address space of the detection pattern memory 41, such a shift of data can be easily realized by renewing (shifting) the address of data by addresses corresponding to the shift quantity t. Then, the shifted data, that is, shift pattern data indicated by a dotted line in FIG. 7B, are stored in the shift pattern memory 42 as shown in FIG. 8 (step 202).

In the difference pattern calculating means 52 in FIG. 8, the difference between the detection pattern data and the shift pattern data is obtained. The difference is obtained by subtraction, with an address of the detection pattern memory 41 corresponding to that of the shift pattern memory 42. The result of the subtraction is recorded in the difference pattern memory 43 (step 203). When the difference pattern data are schematically expressed in an analog manner, they are equivalent to the derivative of the detection pattern data as FIG. 7C shows. That is, the difference pattern data invert their sign from positive to negative corresponding to a high-temperature peak in the detection pattern data, and invert their sign from negative to positive corresponding to a low-temperature trough.

Therefore, by judging the sign bit of the difference pattern data in the temperature distribution detection means 53 and finding inversion from positive to negative, the first and second high-temperature peaks in FIG. 7A can be found (step 204), and by finding the inversion of the sign bit from negative to positive, the low-temperature trough in FIG. 7A can be found. Herein, it should be noted that the accurate positions of the peaks and bottom are shifted in the shift direction (x direction) by half the shift quantity (t/2) (see FIG. 7C). Therefore, position (address) correction is carried out corresponding to this quantity in the temperature distribution detection means 53 in FIG. 8 (step 205).

When a distribution of peaks and troughs is obtained for the case in which the surface of the semiconductor element is equivalently differentiated in the x direction according to the above procedure, another difference processing is carried out in the same manner by changing the direction to shift (in y direction which is perpendicular to x direction) (step 206). By this process, a distribution of peaks and troughs in the y direction is obtained and as a result, a two-dimensional distribution expressed by x and y coordinates is obtained. The result is given to the distribution pattern output means 6 in FIG. 8, and displayed graphically by a CRT display (not shown in the figure) or displayed as a printout output (step 207).

In the example above, the shift quantity of a pattern is set to half the spacial resolution, but if the interval between peaks in the pattern is smaller, it is desired that the shift quantity is also smaller.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A method of using infrared light for measuring the temperature of a semiconductor element which has a surface layer formed with not less than two kinds of materials that have different infrared emissivities, said method comprising the steps of:

(a) determining the emissivity of each of the materials forming the surface layer;
(b) determining a ratio of the areas of each of the materials on the surface layer;
(c) determining a weighted average using the emissivities determined in step (a) and the area ratios determined in step (b);
(d) determining the amounts of infrared emission actually emitted from the surface layer of the semiconductor element and from an atmosphere in which the semiconductor element is present using an infrared detector; and
(e) determining the temperature of the semiconductor element based upon the weighted average determined in step (c) and the actual amount of infrared emission determined in step (d).

2. The method for measuring temperature using infrared light according to claim 1, wherein the temperature of the semiconductor element is determined using a first relation in which the weighted average and the amounts of infrared emission are independent variables and the amount of infrared emission from a standard material, for which temperature is uniquely determined, is a dependent variable.

3. The method for measuring temperature using infrared light according to claim 2, in which the first relation is expressed by the equation:

$$N_T = \{N_m - (1-\epsilon_m) \cdot N_a\}/\epsilon_m$$

wherein $N_T$ is the amount of infrared emission from the standard material, $N_m$ is the actual amount of infrared emission emitted from the semiconductor element, $\epsilon_m$ is the weighted average and $N_a$ is the actual amount of infrared emission emitted from the atmosphere in which the semiconductor element is present.

4. The method for measuring temperature using infrared light according to claim 2, wherein step (a) comprises the steps of;

(a.1) preparing a standard sample with each of the materials forming the surface layer;
(a.2) obtaining the amount of infrared emission from the standard sample at two different known temperatures; and
(a.3) calculating using a second relation wherein the amount of infrared emission from the standard sample is regarded as an independent variable and the emissivity of one of the materials forming the surface layer is a dependent variable.

5. The method for measuring temperature using infrared light according to claim 4, wherein the second relation of step (a.3) is expressed by:

$$\epsilon = (N_{m1} - N_{m2})/(N_{T1} - N_{T2})$$

wherein $\epsilon$ is the emissivity of said one of the surface materials, $N_{m1}$ and $N_{m2}$ are the amounts of infrared emission from the standard sample at two different known temperatures, and $N_{T1}$ and $N_{T2}$ are the amounts of infrared emission of the standard material at the two different temperatures.

6. The method for measuring temperature using infrared light according to claim 1, wherein when the surface layer essentially consists of two kinds of materials which have different optical reflectances in step (b), image data are obtained by detecting the reflected light of a beam of light incident on the surface layer, and the area ratio of each of the two kinds of materials to the surface of the semiconductor element is obtained by binarizing the image data with a constant brightness being a boundary value.

7. The method for measuring temperature using infrared light according to claim 6, wherein the constant brightness is a medium value between two brightness values corresponding to the two kinds of materials.

8. The method for measuring temperature using infrared light according to claim 1, wherein when the surface layer essentially consists of two kinds of materials which have different optical reflectances in step (b), an image is formed on a light receiving face of an image taking means by diffusing light reflected from the surface of the semiconductor element, and the area ratio of each of the two kinds of materials to the surface of the semiconductor element is obtained by comparing the average brightness value of the image with brightness values obtained if each of the two materials independently formed the surface layer of the semiconductor element.

9. A method of using infrared light for obtaining the distribution of surface temperature on a semiconductor element based on an amount of infrared emission, said method comprising the steps of;
(a) obtaining detection pattern data corresponding to a distribution of surface temperature based on data wherein infrared light from a surface of the semiconductor element is incorporated;
(b) obtaining shift pattern data wherein the detection pattern data are shifted in a predetermined direction along the surface of the semiconductor element;
(c) obtaining difference pattern data by taking the difference between the detection pattern data and the shift pattern data; and
(d) obtaining the distribution of surface temperature on the semiconductor element based on a position of inversion at which the difference pattern data invert between positive and negative.

10. The method for measuring temperature using infrared light according to claim 9, wherein step (d) is a step for obtaining the distribution of surface temperature on the semiconductor element based on the quantity shifted in step (b) and the position of inversion.

11. The method for measuring temperature using infrared light according to claim 9, wherein the quantity shifted in step (b) is half the spacial resolution of an image taking means.

12. A device for using infrared light to measure the temperature of a semiconductor element which has a surface layer formed with not less than two kinds of materials which have different infrared emissivities, said device comprising:
an image taking means having sensitivity to infrared light;
an A/D converter which digitizes image data indicative of the surface layer taken by the image taking means and prepares detection pattern data;
a first memory means which stores the detection pattern data in addresses corresponding to positions on the surface layer;
a pattern shifting means which prepares shift pattern data by shifting the detection pattern data in a predetermined direction along the surface of the semiconductor element,
a second memory means which stores the shift pattern data;
a difference pattern calculating means which prepares difference pattern data by calculating the difference between the detection pattern data and the shift pattern data;
a third memory means which stores the difference pattern data; and
a temperature distribution detection means which obtains a distribution of surface temperature for the semiconductor element based on inversion positions at which the difference pattern data invert between positive and negative.

13. The device for measuring temperature using infrared light according to claim 12, wherein the first, second and third memory means comprise a frame memory.

* * * * *